United States Patent [19]

Cornair

[11] 3,835,527
[45] Sept. 17, 1974

[54] MULTI-PURPOSE SUPPORT APPARATUS
[76] Inventor: Russell J. Cornair, 1083 Rolling Meadows Dr., Akron, Ohio 44313
[22] Filed: Sept. 29, 1972
[21] Appl. No.: 293,310

[52] U.S. Cl............ 29/560, 29/564, 144/1, 408/20, 408/88, 408/234, 408/236, 90/17
[51] Int. Cl............ B23p 23/00
[58] Field of Search............ 29/38 R, 38 A, 35.5, 44, 29/560, 564; 82/2 D; 90/17, 58; 408/88, 20, 234–237; 144/1

[56] References Cited
UNITED STATES PATENTS

| | | | |
|---|---|---|---|
| 1,991,285 | 2/1935 | Lindner | 408/88 |
| 2,051,720 | 8/1936 | Kingsbury | 408/88 X |
| 2,053,400 | 9/1936 | Kingsbury | 408/88 |
| 3,011,245 | 12/1961 | Mueller | 29/38 A |
| 3,245,133 | 4/1966 | Rey | 29/38 A |

Primary Examiner—Leonidas Vlachos
Attorney, Agent, or Firm—Price, Heneveld, Huizenga & Cooper

[57] ABSTRACT

A universal, multi-purpose support table for simultaneously supporting a work piece and at least one power or other tool at various horizontal and vertical positions with respect to the work piece. The table includes a top having an opening beneath which is supported a work support pan. The table top is formed from two segments, and supported by support legs, the top segments being selectively mountable in either a horizontal plane or with one mounted horizontally with the other supported vertically therefrom. Saddle-type brackets are included for removably mounting a tool radially across either the vertically or horizontally mounted top segments.

9 Claims, 8 Drawing Figures

PATENTED SEP 17 1974 3,835,527

MULTI-PURPOSE SUPPORT APPARATUS

This invention relates to universal support means and, more particularly, to a multi-purpose support table for simultaneously supporting a work piece and one or more of varying types of power or other tools at various horizontal and vertical positions with respect to that work piece.

BACKGROUND OF THE INVENTION

Modern industrial processes and procedures often require a number of manufacturing operations and work functions to be performed on a single manufactured item or work piece. Such procedures may require sequential or simultaneous operations such as boring, countersinking, reaming and routing, as well as many other milling or machining type operations. Typically, the work piece on which the operations are to be performed is fixed in a single position and the various operations are then carried out on the various portions of the work piece using the required tools. Often such procedures require the frequent interchanging of the power tools performing the operations thereby requiring these tools to be mounted, aligned, and removed many times even with respect to a single work piece. Such mounting and alignment has required that great amounts of time be spent in setting up the tools to perform the operations thereby reducing the amount of valuable working time available. Further, even allowing for the substantial time involved in mounting and aligning the various tools, the structures and fixtures used to perform the mounting and alignment were often bulky, inconveniently located, and could not be used to mount the tools in all of the various horizontal and vertical positions needed to complete a job.

Therefore, to my knowledge there has been no previously available, universal, multi-purpose support table which could both support a work piece and simultaneously support one or more tools for performing operations on that work piece wherein the tools were quickly, conveniently, and easily mounted and aligned in any horizontal or vertical position to that work piece. The present compact, modular, multi-purpose support table was, therefore, conceived in recognition of and as an answer to these above-described mounting and alignment problems.

SUMMARY OF THE INVENTION

Accordingly, it is a purpose of the present invention to provide a universal, multi-purpose support table which is sufficiently adaptable and flexible to allow power tools to be supported thereon in various horizontal and vertical positions with respect to a work piece which is also supported by the table. Further, it is an additional purpose to provide a means for removably mounting various types of power tools and the like in a manner which allows the tools to be quickly and conveniently interchanged, mounted in a desired position on the multi-purpose table and aligned for the correct positioning of the manufacturing operation.

In accordance with these purposes, the present invention comprises a universal, multi-purpose support table which simultaneously supports a work piece and at least one tool for performing an operation on the work piece. The table includes, in the preferred embodiment, a table top, formed from two segments. The table top has a central aperture beneath which a work support pan is suspended by suitable fastening means a predetermined distance below the level of the table top. The work piece is supported by the work support pan and extends upwardly through the central aperture. The table top and suspended work support pan are in turn supported above a supporting surface by a plurality of support legs comprising leg members having a cross section corresponding to the shape of the top. One edge of the support legs is received in a recessed channel on the underside of the circular table top and is secured therein by bolts extending through the table top and recessed below the top surface thereof. The remaining curved edge of the supporting legs contacts the supporting surface.

One or more saddle brackets is included in the table assembly and extends across the table top between the edge of the central aperture and the outer peripheral edge of the table top. Various types of power tools and the like may be mounted on the saddle brackets, which brackets are in turn locked in a desired annular position about the work piece with a threaded locking means. Use of the saddle brackets is not mandatory for the mounting or support of power tools and the like. Thus, such tools may also be mounted directly on the table top segments.

Each of the semi-circular, table top segments includes an integral bracing member formed on the undersurface of the segment and including an edge which is flush with the rectilinear, diametrical edge of the semi-circular segment. Using the flush surface of the bracing member, one top segment may then be mounted vertically upon two of the saddle brackets after which the saddle brackets may be locked in position on the remaining semi-circular, horizontally mounted, top segment. One or more additional saddle brackets may then be utilized to mount power tools in various vertical positions on the upright semi-circular segment for performing functions similar to that of a drill press and the like.

Alternatively, the two table top segments may be secured with their rectilinear edges abutting one another thereby forming a horizontal table top. The saddle brackets may then be used to secure various power tools in various positions around the work piece.

These and other objects, purposes, advantages and features of the present invention will become more apparent from a study of the following description taken in conjunction with the drawings.

DESCRIPTION OF THE PREFERRED EMBODIMENT

Figure 1:
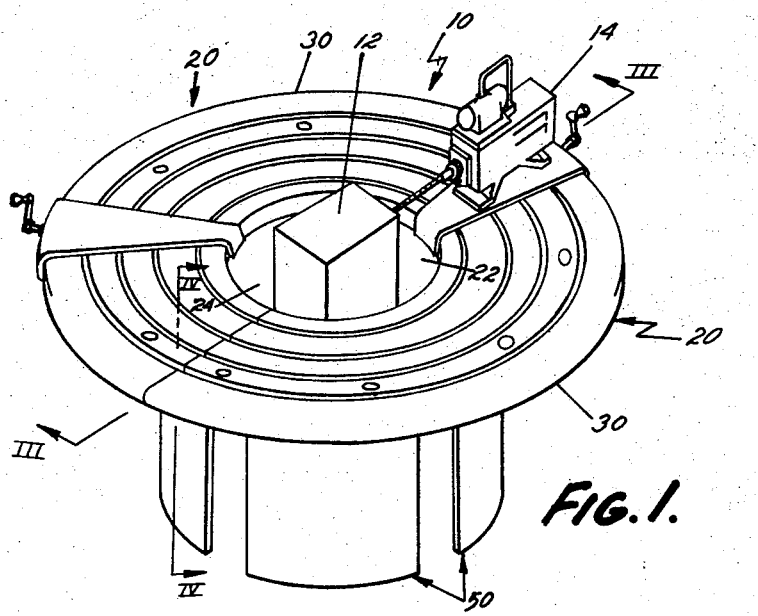
FIG. 1 is a perspective view of the assembled multi-purpose support apparatus embodying the present invention.
Figure 2:
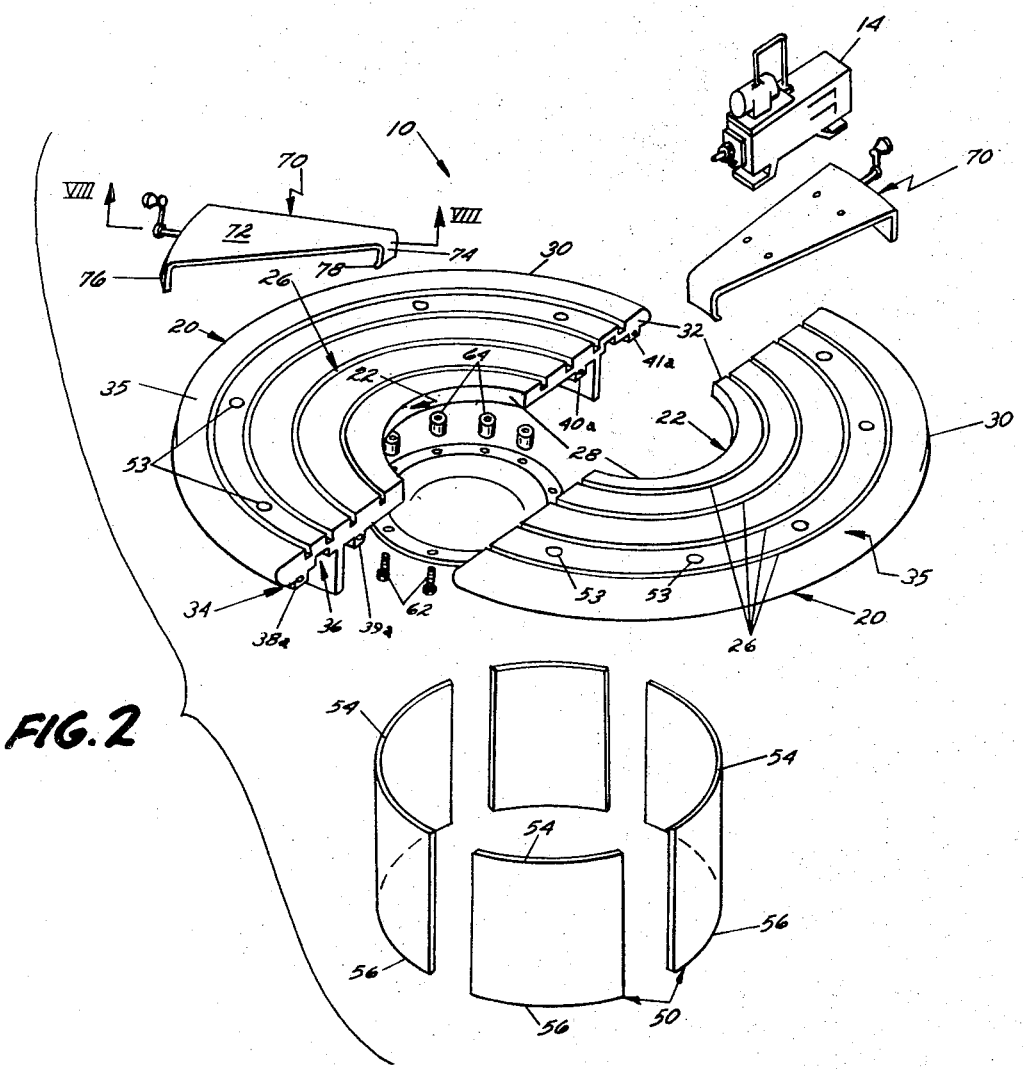
FIG. 2 is an exploded, perspective view of the support apparatus shown in FIG. 1.

Referring now to the drawings in greater detail, FIGS. 1 and 2 show the multi-purpose support table 10 both assembled and with its various parts exploded. Table 10 forms a base for supporting a work piece 12 on which various milling, machining and other manufacturing operations can be performed by means of power tools such as a fluid motor drill 14. Table 10 includes two identical semi-circular table top segments or platforms 20 which are supported by a plurality of curvilinear table or support legs 50. The table top segments 20 each include a central, semi-circular aperture 22 which, when the segments are assembled together in their horizontal orientation as shown in FIG. 1, form a central aperture 24. Suspended beneath the central aperture 24 by means of suitable fastening means comprising bolts 62 and spacers 64 is a work support pan 60 (FIG. 2) for supporting a work piece within aperture 24. One or more saddle brackets 70 are mounted radially across the table top segments 20 between the edge of semi-circular recess or cutout 22 and the outer periphery or edge 26 of segments 20 for securing the drill motor 14 or other power tool at various annular positions about the work piece 12.

Figure 3:
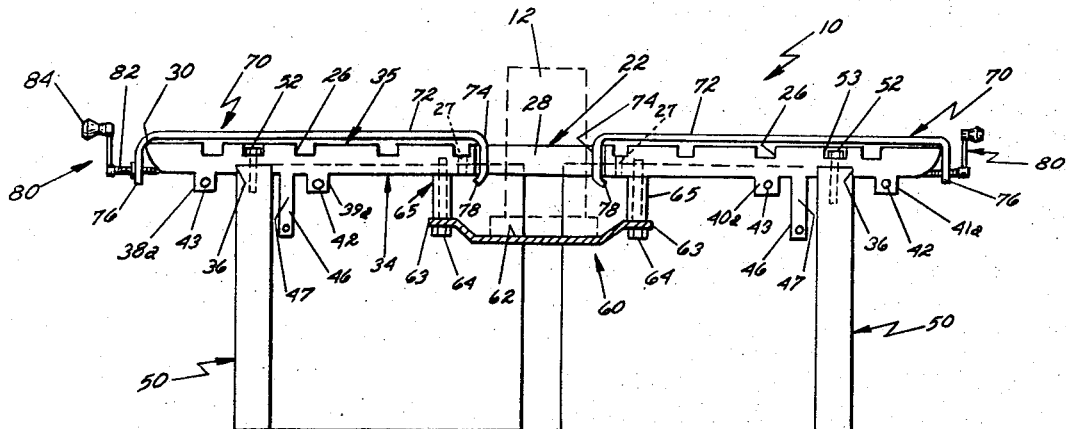
FIG. 3 is an elevational view of the assembled multi-purpose apparatus shown in cross section and taken along line III—III of FIG. 1.

Referring now to FIGS. 2 and 3, the semi-circular table top segments 20 each include a diametrical edge 32 in which is formed, a centrally located, semi-circular cutout portion 22. The periphery of the cutout portion 22 forms a semi-circular inner edge 28 which is concentric with the larger, semi-circular outer peripheral edge 30. The top supporting or working surfaces 35 of segments 20 each include a series of semi-circular, concentric, recessed grooves 26. These grooves are aligned with one another when the table top segments are secured together in their horizontal position thereby forming several concentric, circular grooves as shown in FIG. 1. The grooves are variously used for the drainage of cooling, lubricating or cutting oil, or for the deposition of air supply or electrical conduits below the working surface of the table. The top or working surface is thus left clear and unobstructed.

In this connection, it will be understood that the radially innermost groove 26, i.e., the groove closest to edge 28, is located inside the vertical circumferential plane around the edge of work support pan 60 as shown in FIG. 3. Thus, small through holes 27 (FIG. 3) are drilled in the bottom of the innermost groove through the remainder of the table top to allow oil which may have drained into the innermost groove to drain through holes 27 into pan 60. The top of table 10 thus remains clear and dry.

Figure 4:
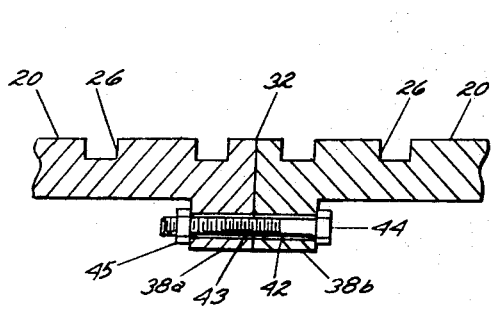
FIG. 4 is a fragmentary, cross-sectional view taken along line IV—IV of FIG. 1 showing means for securing the table top segments of the present apparatus in their horizontal position.

On the undersides or bottom surfaces 34 of the top segments 20 are formed annular recessed channels 36 in which the support legs 50 are received and secured as will be described below. Integral fastening means are also provided on the undersurface of each table top segment 20 for securing the segments together along their rectilinear edges 32 to form the horizontal orientation of the table 10 as shown in FIGS. 1, 3 and 4. Further, integral bracing members 46 are provided on the undersides of segments 20 and have one edge 47 formed flush with and lying in the same plane as the rectilinear edge 32 of the segment. Bracing members 46 provide support for the segments when mounted vertically, as will be more fully described below.

Figure 5:
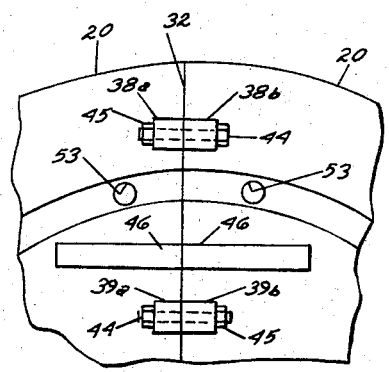
FIG. 5 is a fragmentary, bottom view of the securing means shown in FIG. 4.

As shown in FIGS. 4 and 5, the top segment fastening means comprise a series of integral, cooperating, fastening blocks 38 through 41. Each top segment 20 includes at least one integral block which abuts an integral block on the opposite segment. Thus, block 38 includes abutting blocks 38a and 38b, etc. Blocks 38 through 41 include holes 42 and 43 which receive bolts 44 passed therethrough. Bolts 44 are secured and tightened with nuts 45. Consequently, it will be understood that, in the preferred embodiment, each table top segment 20 will have four integral fastening blocks secured together via bolts and nuts passed therethrough. Of course, other types and arrangements of fastening means may be used to secure the table segments together. For example, blind, threaded holes may be provided in at least one portion of each block 38 through 41, with bolts being threaded thereinto via through holes in the opposing block portions.

Referring now to FIG. 3, the curvilinear support legs 50 are shown secured in the recessed channels 36 provided therefor on the underside 34 of the top segment 20. Curvilinear support legs 50 are secured within recessed channel 36 by means of fastening means or bolts 52 extending through the top segment 20 and into the thickness of the leg 50 from the top surface or upper side 35 of segments 20. Bolts 52 are recessed below top surface 35 in recessed holes 53 thereby providing a smooth top surface for supporting the power tools 14 on saddle brackets 70 thereon.

In the preferred embodiment, the support legs 50 comprise cast or formed plate leg members having a cross section formed in the shape of a portion of a circle whose radius corresponds to that of the annular recess channel 36. Thus, one curvilinear edge 54 of each of the support legs 50 will be received in channel 36 while the remaining curvilinear edge 56 contacts the supporting surface or floor. Thus, the table top segments 20 will be supported a distance from the floor as determined by the height of the several support legs 50.

As is also shown in FIG. 3, the work support pan 60 is suspended beneath the central aperture 24 in top segments 20 for supporting work piece 12 which extends upwardly through that aperture. Pan 60 includes a depressed support area 62 and an annular flange 63 through which suitable securing means such as bolts 64 are secured to suspend the pan from the undersurface 34 of top segments 20. Depending on the height or level at which the work piece 12 must be supported, hollow cylindrical spacers 65 are inserted between the flange 63 and underside 34 to appropriately space the support pans 60 therefrom.

Figure 8:
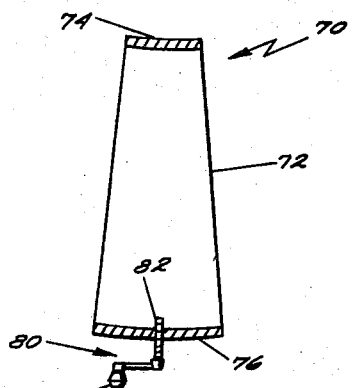
FIG. 8 is a cross-sectional view taken along line VIII—VIII of FIG. 2 showing the bottom of a saddle bracket.

In reference to FIGS. 2 and 3, the saddle bracket 70 used to secure and support various power tools at annular positions around the work piece 12 on top segments 20 are shown. Generally, saddles 70 comprise U-shaped brackets having planar areas 72 with inner flanges 74 and outer flanges 76 extending at right angles from either end edge thereof. As shown in FIG. 8, flanges 74 and 76 have curved cross sections and are concentric with one another, the inner flange 74 having a radius corresponding to the radius of the central aperture 24 while the outer flange 76 has a radius corresponding to the radius of the outer peripheral edge 30 of top segments 20. Further, the inner flange 74 has a slightly inturned or hooked lower edge 78 (FIGS. 2 and 3) which facilitates the securing of the inner portion of brackets 70 around the inner edge 28 of central aperture 24. Each of the saddle brackets 70 also includes a locking means 80 having a threaded rod 82 which may be turned by a handle 84 such that inner flange 74 may be tightly engaged and locked with inner edge 28 of segments 20.

As will now be understood, the saddle bracket means may be easily placed in engagement with inner edge 28 to extend radially outwardly across the width of top segment 20 and over outer edge 30 in any annular position around work piece 12. The brackets are locked in any of these positions by simply tightening locking means 80 securely against edge 30 of top segments 20 thereby engaging flanges 74 and 76 with inner edge 28 and outer edge 30, respectively. Further, the power tools such as drill motor 14 need not be removed from brackets 70 in order to remove them from the support table 10. Rather, one saddle bracket 70 is provided for each separate power tool thereby allowing quick and convenient interchanging of the various tools by merely inserting and removing the entire saddle bracket 70. Such insertion and removal thereby obviates the need to exactly align these power tools each time they are mounted on the support table 10 since they may be exactly aligned when they are first mounted on the saddle brackets and thereafter will remain in alignment whenever they are mounted on the supporting table.

However, mounting holes (not shown) may be provided in the table top segments for mounting tools directly on the table top. Thus, use of the saddle brackets for mounting tools is not absolutely mandatory.

Figure 6:
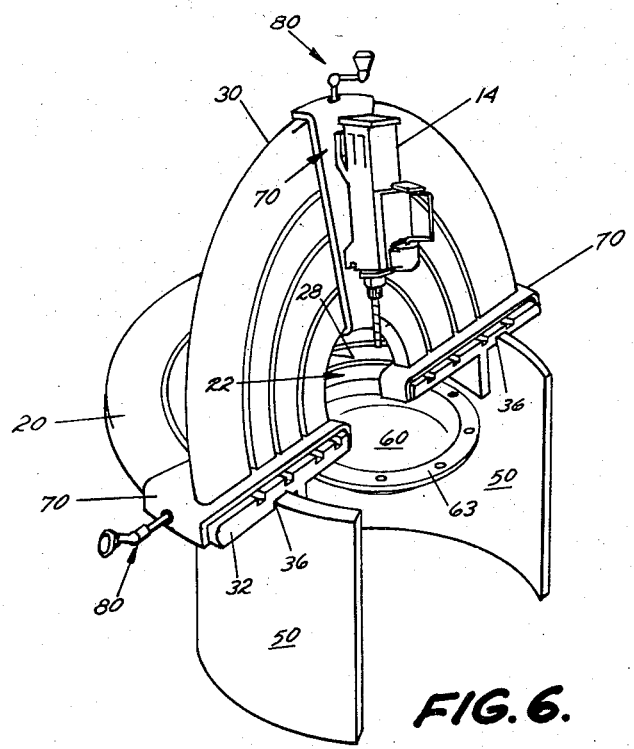
FIG. 6 is a perspective view of the support apparatus showing one of the table top segments mounted in a vertical orientation for supporting a power tool thereon.
Figure 7:
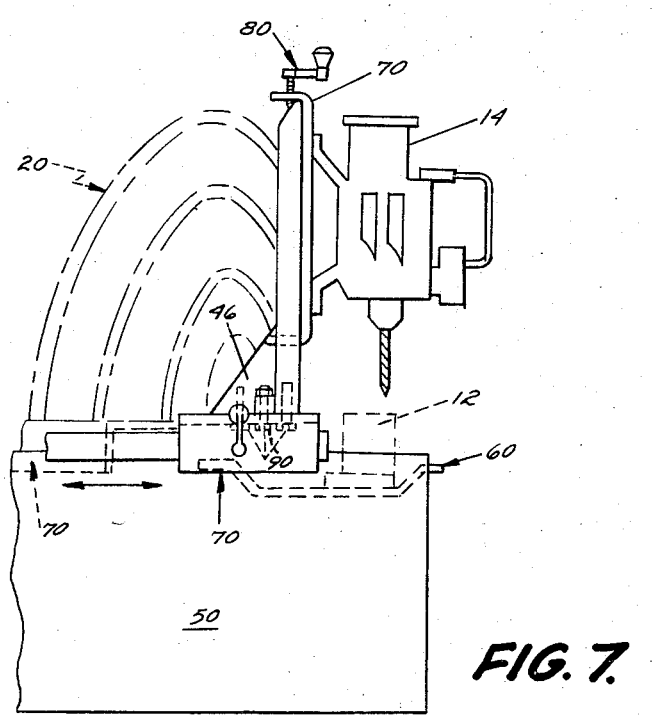
FIG. 7 is a side elevation of the support apparatus arrangement shown in FIG. 6.

In addition to the horizontal orientation of the multipurpose support table 10 as shown in FIGS. 1 through 5, the table 10 may be arranged to mount power tools such as drill motor 14 in a vertical orientation in order that they may function as a drill press or other similar vertical tools as shown in FIGS. 6 and 7. As depicted therein, the identical elements utilized to form the horizontally oriented support table may be rearranged to provide the vertical orientation. In this latter form, one of the two semi-circular table top segments 20 is mounted as usual on a pair of the support legs 50, the legs 50 being received in recess channels 36 on the undersurface thereof as described above. The work support pan 60 is mounted below the single horizontally disposed top segment 20 utilizing only a portion of the securing holes provided in flange 63 of the pan 60. The second or remaining table top segment 20 is mounted vertically atop two of the saddle brackets 70 which in turn are secured on the horizontally disposed segment 20. As mentioned above, the vertically disposed segment 20 is supported on its rectilinear edge 32 and braced by bracing member 46 having edge 47 lying in the same plane with the rectilinear edge 32 thereby forming a planar support base. Fastening or securing means such as bolts 90 are threaded into both the thickness of the vertically oriented top segment 20 and bracing member 46 from the underside of saddle bracket 70 to securely retain the segment 20 in its vertical position. Bolts 90 may also be passed through both the saddle bracket and the holes 42, 43 in blocks 38 through 41 to further secure the segment in its vertical position. Following the mounting of the top segment 20 in its vertical position, a power tool such as drill motor 14 is secured on the vertical segment via a saddle bracket 70 between the inner edge 28 of semi-circular cutout 22 and the outer peripheral edge 30 of the segment and retained thereon by locking means 80. It will also be understood that the vertical top segment may be secured directly to the horizontal segment or segments without using the saddle brackets 70. This is accomplished by passing or threading bolts through or into holes provided in the horizontal table top segments.

The drill motor mounted on saddle bracket 70 may accordingly be adjusted within a single vertical plane by adjusting the annular position of the saddle bracket 70 around the circumferences of the semi-circular inner edge 28 and semi-circular outer peripheral edge 30. Similarly, the vertical plane in which the drill motor is positioned may be adjusted by adjusting the position of one of the saddle brackets 70 securing the vertically positioned top segment 20 to the horizontally positioned segment, as shown by the phantom lines in FIGS. 6 and 7. In order to accomplish this adjustment, one securing bolt is provided as a pivot in the stationary saddle bracket 70 such that when the other saddle bracket is moved, the vertically positioned top segment 20 may pivot therearound.

Of course, one vertically mounted table top segment may be used with two other segments secured in the normal horizontal positions (not shown). This arrangement allows both vertical and horizontal working operations to be performed simultaneously on the work piece.

As explained above, the universal, multi-purpose support table 10 may be assembled in either a vertical or horizontal orientation to support various power tools in an infinite variety of positions to perform working operations on a supported work piece 12. The support table 10 provides sufficient flexibility to allow the various tools to be quickly and conveniently interchanged by merely securing each tool to a saddle bracket. Each bracket may then be secured in any one of several horizontal or vertical annular positions surrounding the centrally located work piece 12. Mounting and alignment problems are obviated since the saddle brackets are secured radially across the table top segments 20 as they are located thereon. Thus, once the power tool has been secured with respect to the saddle bracket, it need not be realigned every time it is interchanged with another tool on the support table. Further, simultaneous work operations may be performed on a work piece 12 by locating several of the saddle brackets 70 annularly around the work piece. Additionally, a third table top segment may be utilized in conjunction with two other horizontally oriented table top segments 20 to simultaneously provide horizontally and vertically disposed power tools for performing a plurality of functions on a specified work piece. As is also apparent, the support table 10 may be used for all types of working operations including processes performed on metal, wood, plastic and the like. Therefore, the multipurpose support table provides a completely universal and flexible support base or table which may be easily adapted to one's particular and individual manufacturing requirements.

It will be understood that the terms horizontal, vertical, above, below, top, bottom and underside are used in this description for purposes of explanation only and are not intended to limit the invention in any way.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows.

1. A universal support table for simultaneously supporting a work piece and at least one tool for performing an operation on said work piece comprising: means for supporting said work piece with respect to said table; said table including means for selectively mounting said tool vertically or horizontally with respect to said work piece; said means for mounting said tool comprising segments of the top of said table and means for removably securing said tool to one of said segments; and means for mounting said one of said segments in different positions with respect to the other of said segments.

2. The table of claim 1 wherein the other of said table top segments is supported above a supporting surface by at least one curvilinear leg member having two curvilinear edges one of which is secured in a recessed channel provided therefor on the underside of said table top, and the other of which contacts said supporting surfaces.

3. The table of claim 1 wherein said table top includes a central aperture therein beneath which is suspended said work support means for supporting said work piece during the performance of said operation.

4. The table of claim 1 wherein said table top segments comprise semi-circular sections each including a rectilinear, diametrical edge and means along said rectilinear edge for fastening said sections together.

5. The table of claim 4 wherein said sections abut one another along said rectilinear edge and are secured together with said fastening means thereby forming a horizontal circular table top.

6. The table of claim 4 wherein at least one of said sections includes a brace member projecting normally from the undersurface thereof and has an edge flush with said rectilinear, diametrical edge; means for mounting said one section vertically on said other section with the rectilinear edges thereof adjacent each other and with said brace member providing support for the vertically mounted section; and means for removably mounting said tool on said vertically mounted section.

7. The table of claim 6 in which the means for mounting the one section to the other and the means for mounting the tool are separate saddle brackets.

8. The table of claim 1 wherein said table top segments include inner and outer concentric, curvilinear edges; said means for removably supporting said tool comprising at least one saddle bracket having a planar portion with inner and outer integral, concentric, curvilinear flanges extending at right angles from one surface thereof; said outer flange including locking means for tightening said inner flange against said inner edge whereby said saddle bracket is locked in place thereon.

9. The table of claim 8 wherein said inner flange is hooked to extend under a portion of top segment for further securing said saddle bracket to said segment.

* * * * *